United States Patent
Baumgartner et al.

(10) Patent No.: US 7,405,527 B2
(45) Date of Patent: Jul. 29, 2008

(54) METHOD FOR CONTROLLING AN ELECTRONICALLY-COMMUTATED DC MOTOR

(75) Inventors: Johann Baumgartner, Moosburg (DE); Guenther Gschossmann, Ampfing (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/541,728

(22) PCT Filed: Jan. 9, 2004

(86) PCT No.: PCT/EP2004/000094

§ 371 (c)(1),
(2), (4) Date: Apr. 28, 2006

(87) PCT Pub. No.: WO2004/064242

PCT Pub. Date: Jul. 29, 2004

(65) Prior Publication Data

US 2006/0238150 A1 Oct. 26, 2006

(30) Foreign Application Priority Data

Jan. 10, 2003 (DE) .................... 103 00 634

(51) Int. Cl.
*H02P 6/00* (2006.01)

(52) U.S. Cl. .................... 318/400.01; 318/400.32; 318/400.33

(58) Field of Classification Search ............... 318/138, 318/254, 439, 430–434, 700, 701, 400.01, 318/400.32, 400.33
See application file for complete search history.

(56) References Cited

U.S. PATENT DOCUMENTS

| | | | | |
|---|---|---|---|---|
| 4,772,839 A * | 9/1988 | MacMinn et al. | ............ | 318/696 |
| 5,180,960 A * | 1/1993 | Austermann | ................ | 318/701 |
| 5,982,117 A * | 11/1999 | Taylor et al. | ................ | 318/254 |
| 6,184,636 B1 | 2/2001 | Lewis et al. | | |
| 6,250,434 B1 | 6/2001 | Baumgartner et al. | | |
| 6,650,082 B1 * | 11/2003 | Du | ............................ | 318/701 |
| 2003/0030406 A1* | 2/2003 | Takahashi et al. | ............ | 318/714 |
| 2003/0107337 A1* | 6/2003 | Kokami et al. | .............. | 318/254 |

FOREIGN PATENT DOCUMENTS

| | | |
|---|---|---|
| DE | 197 31 696 A1 | 2/1999 |
| DE | 100 19 161 A1 | 11/2000 |

(Continued)

OTHER PUBLICATIONS

Jang et al [IEEE Proceedings: Electric Power Application vol. 149, No. 2, Mar. 2, 2002 pp. 137-142].*

(Continued)

*Primary Examiner*—Rita Leykin
(74) *Attorney, Agent, or Firm*—Crowell & Moring LLP

(57) ABSTRACT

A method for controlling an electronically commutated DC motor is provided, the DC motor including at least one particularly permanent magnetic rotor and a wound stator, which is a drive motor for an adjuster device on a pneumatically operated disc brake. The rotor position is determined from electrically measured parameters without sensing of the rotor position. The invention is characterized in that two determination methods for determining the rotor position from electrically measured parameters are combined with each other, whereby one is an inductive measurement and a further one of the determination methods is a measurement of the induced voltage.

20 Claims, 2 Drawing Sheets

FOREIGN PATENT DOCUMENTS

EP    0 536 113 B1    4/1995
WO    WO 02/14125 A2    2/2002

OTHER PUBLICATIONS

Jang G H et al. Position detection and start-up algorithm of a rotor in a sensorless BLDC motors utilizing inductance variation.☐☐IEEE Proc-Electr. Power Application, vol. 149, No. 2, Mar. 2002.*

G.H. Jang, et al., "Position detection and start-up algorithm of a rotor in a sensorless BLDC motor uitlising inductance variation", *IEE Proceedings: Electric Power Applications, Institution of Electrical Engineers*, vol. 149, No. 2, Mar. 2002, pp. 137-142.

* cited by examiner

METHOD FOR CONTROLLING AN ELECTRONICALLY-COMMUTATED DC MOTOR

BACKGROUND AND SUMMARY OF THE INVENTION

The invention relates to a method of controlling an electronically commutated d.c. motor having, in particular at least one permanent-magnetic rotor and a wound stator. The d.c. motor is a driving motor for an adjusting device of a pneumatically actuated disc brake. A position of the rotor is determined from electrically measurable parameters without any sensing of the rotor position.

Various methods are known of controlling electrically commutated d.c. motors, in which the angle-of-rotation position and/or the position of the rotor is determined from directly measurable electric quantities, such as the current or voltage, without the use of a position sensor.

Thus, European Patent document EP 0 536 113 discloses the determination of the rotor position from an inductance measurement. This method is characterized by a high precision while the demand for computing power is relatively high.

In view of this prior art, one aspect of the invention is to further develop the method of the above-mentioned type such that a satisfactory position recognition is achieved at many different rotational speeds of the rotor, preferably while reducing the computing power demand.

The invention solves this task by method of controlling an electronically commutated d.c. motor, which has at least one, in particular, permanent-magnetic rotor and a wound stator. The d.c. motor is a driving motor of an adjusting device of a pneumatically actuated disc brake. The rotor position is determined from electrically measurable parameters without any sensing of the rotor position. Two determination methods for detecting the rotor position from electrically measurable quantities are combined with one another. One of the determination methods includes an inductance measurement and another of the determination methods includes measurement of the induced voltage.

Advantageous embodiments are described and claimed herein.

According to the invention, for determining the rotor position, two determination methods for determining the rotor position from electrically measurable parameters or quantities are combined with one another. One of the determination methods includes an inductance measurement and another of the determination methods includes a measurement of the induced voltage.

It is advantageous for two or more determination methods to be mutually combined in this manner. One determination method operates particularly well at low rotational speeds, while the other is more precise at higher rotational speeds. Particularly, in the case of a use on an adjusting device of a disc brake, the position of the rotor should always be determined very precisely in order to prevent a faulty operation of the adjusting device. This is particularly true because only limited computer power is available at the disc brake.

The invention is particularly suitable for controlling a commutated d.c. motor, which is used as the drive of an adjusting device of a preferably pneumatically actuated (with the exception of the adjustment function) brake disc, as known, for example, from European Patent application PCT/EP01/09367.

It is true that it is known per se (see the article "New Commutation Electronics for Low-Noise-Operated Brushless Electric Motors", *Drive Technology* 40, 2001, No. 10) to determine the rotor position not only by using an inductance measurement, but also from the induced voltage in the non-energized winding. It is also known that this method requires a lower computing power than the determination by the use of an inductance measurement. The processor can thus be smaller and can, therefore, have a more cost-effective design.

On the other hand, it is also known that the method disclosed in *Drive Technology* supplies precise, usable results only starting at certain rotational speeds.

Thus, when the rotational speed again falls below a minimum rotational speed, according to a variant of the invention, a switch-over takes place again to the method for the inductance measurement (European Patent document EP 0 536 113), which method operates well, particularly at lower rotational speeds, but is more intensive with respect to the needed computer power (and is therefore more suitable for low rotational speeds).

It is beneficial that, also at a zero rotational speed, a result is available, which is an advantage particularly in the case of a use on a brake.

BRIEF DESCRIPTION OF THE DRAWINGS

In the following, the invention will be described by means of the drawing with reference to the embodiments.

DETAILED DESCRIPTION OF THE DRAWINGS

Figure 1:
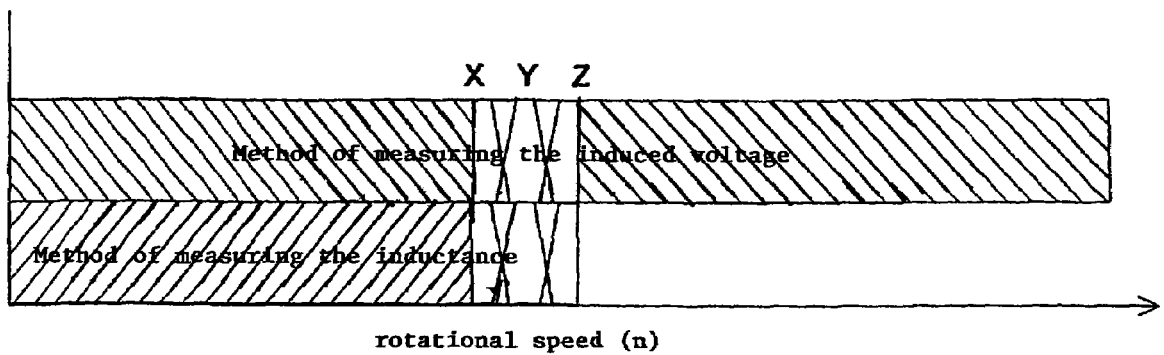
FIG. 1 is a schematic representation of the control method according to the invention.

As illustrated in FIG. 1, at low rotational speeds Z, the method of measuring the induced voltage as well as the method of the inductance measurement are used. As an alternative, below a limit-value rotational speed to be determined empirically (not shown here), it would theoretically also be possible to switch-off the method of measuring the induced voltage.

Above the rotational speed Z, only the method of the induced voltage is used.

The rotational speed Z is determined in that in each case the difference is detected between the results of the two determination methods. Since it is known that the method of measuring the induced voltage does not work satisfactorily at low rotational speeds, in the parallel operation of both methods, at low rotational speeds, the result of the inductance measurement is continuously compared with that of the measurement g of the induced voltage.

If there is a falling below a defined desired limit value between these two values at a rotational speed X, it can be assumed that the rotational speed is now sufficiently large in order to switch over only to the method of measuring the induced voltage.

Nevertheless, for reasons of safety, the switching-over to the sole operation of the methods of measuring the induced voltage, however, does not take place until a rotational speed X+Y=Z has been reached; that is, in the range between X and Z, both methods continue to be used in order to be sure that the rotational speed is exceeded, at which constantly good results of the method of the measurement of the induced voltage can be expected, specifically since a slight decrease of the rotational speed can also always be expected.

Figure 2:
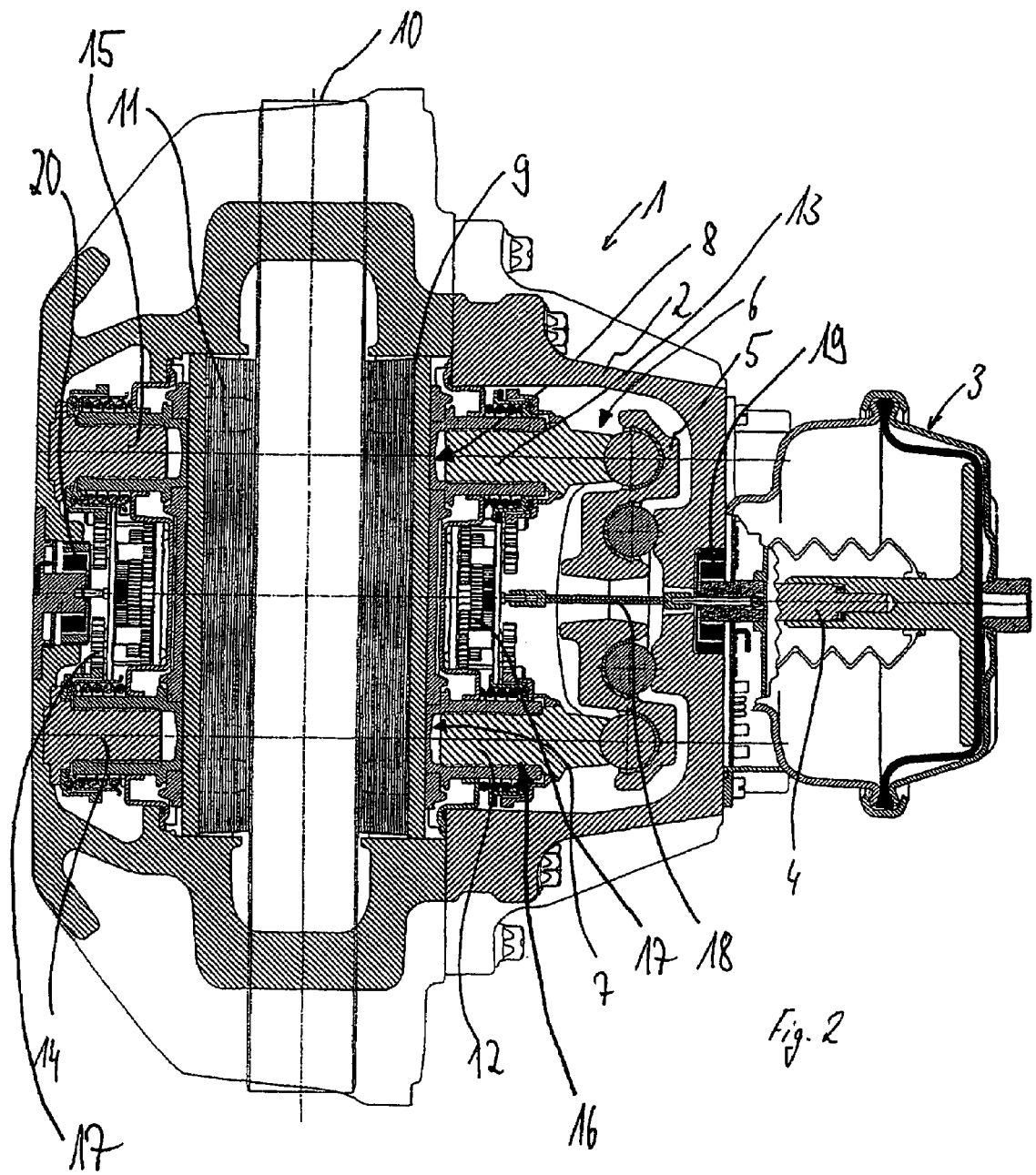
FIG. 2 is a sectional view of a pneumatically actuated disc brake with an electromechanical adjusting function.

FIG. 2 shows a pneumatically actuated disc brake 1 having a caliper 2 on which a brake cylinder 3 is arranged, whose piston rod 4 is used for actuating an eccentrically disposed rotary lever 5 of a brake application device 6.

The rotary lever 5 is used for directly or indirectly displacing, by way of intermediate elements, at least one (while here two) pressure piece 7, 8 in the direction of a brake pad 9 in order to press the latter during braking against a, for example, axially displaceable brake disc 10. Because of the design of the caliper 2 as a fixed caliper, the brake disc is displaced against the other brake pad 11 on the other side of the brake disc 10.

To adjust for brake pad wear, two adjusting devices 12, 13, 14, 15, respectively, can be provided on each side of the brake disc, which are each driven electromechanically. They consist here of a mutually screwable and, therefore, longitudinally adjustable screw/sleeve arrangement 16, which is in each case acted upon by an electric motor 19, 20 on each side of the brake disc by way of a gearing 17 and/or a driving connection 18. The method of FIG. 1 is particularly suitable for controlling these electric motors for such or similar brakes. It can be implemented on a "small" control computer having a low computing power directly on the brake (not shown here), or on a control unit of the brake or a higher-ranking braking system of a vehicle (such as an ABS, EBS).

TABLE OF REFERENCE SYMBOLS disc brake 1
caliper 2
brake cylinder 3
piston rod 4
rotary lever 5
brake application device 6
pressure pieces 7, 8
brake pad 9
brake disc 10
brake pad 11
adjusting devices 12, 13, 14, 15
screw/sleeve arrangement 16
gearing 17
driving connection 18
electric motor 19, 20

The invention claimed is:

1. A method of controlling an electronically commutated d.c. motor having a permanent-magnet rotor and a wound stator, the d.c. motor being used as a driving motor for a wear adjusting device of a pneumatically actuated disc brake, the method comprising the acts of:
providing a first method for determining a position of the rotor from electrically measurable parameters without sensing the rotor position by measuring an inductance;
providing a second method for determining the rotor position from electrically measurable parameters without sensing the rotor position by measuring an induced voltage; and
combining the first and second methods to detect the rotor position in order to control the electronically commutated d.c. motor so that, for all rotational speed values below a limit value rotational speed both the first and the second methods are used contemporaneously in a parallel manner to determine the rotor position.

2. The method according to claim 1, wherein below the limit value rotational speed, the method further comprises the act of comparing results of the inductive measurement and the measurement of the induced voltage.

3. The method according to claim 1, wherein above the limit value rotational speed, the determination of the rotor position occurs exclusively via the measurement of the induced voltage.

4. The method according to claim 2, wherein above the limit value rotational speed, the determination of the rotor position occurs exclusively via the measurement of the induced voltage.

5. The method according to claim 2, wherein the limit value rotational speed is determined by determining a difference between results of the first and second methods.

6. The method according to claim 3, wherein the limit value rotational speed is determined by determining a difference between results of the first and second methods.

7. The method according to claim 4, wherein the limit value rotational speed is determined by determining a difference between results of the first and second methods.

8. The method according to claim 1, wherein when a rotational speed is above a speed at which a difference between the first and second methods falls below a defined desired limit value, plus a rotational speed range, the method determines the rotor position exclusively by way of measuring the induced voltage.

9. The method according to claim 8, wherein when the rotational speed falls below a limit value rotational speed, both the inductive measurement and the measurement of the induced voltage are used in a parallel manner to determine the rotor position.

10. A method for detecting a rotor position of an electronically commutated d.c. motor that drives a wear adjustment device of a pneumatic disc brake, the d.c. motor including at least a permanent-magnet rotor and a wound stator, the method comprising the acts of:
providing a first method for detecting the rotor position from electrically measurement parameters without sensing the rotor position via an inductance measurement;
providing a second method for detecting the rotor position from electrically measurable parameters without sensing the rotor position via a measurement of an induced voltage; and
depending upon a rotational speed of the d.c. motor, combining the first and second methods to detect the rotor position such that for all rotational speed values below a limit value rotational speed both the first and the second methods are used contemporaneously in a parallel manner to determine the rotor position.

11. The method according to claim 10, wherein below the limit value rotational speed, results of the first and second method measurements are compared with one another.

12. The method according to claim 10, wherein above the limit value rotational speed, the rotor position is determined exclusively by measuring the induced voltage.

13. The method according to claim 12, wherein the limit value rotational speed is determined from a difference between results of the first and second methods.

14. The method according to claim 13, wherein when the rotational speed is above a rotational speed range plus a speed in which a difference between the first and second methods falls below a defined desired limit value, the determination of the rotor position takes place exclusively by measuring the induced voltage.

15. A method of controlling a d.c. electric motor, comprising the acts of:
calculating a first rotor speed from a first method for determining a rotor position by measuring an inductance of the motor;
calculating a second rotor speed from a second method for determining the rotor position by measuring an induced voltage of the motor, contemporaneously in parallel with the first method;

determining a limit value rotational speed of the motor based on the calculated first and second rotor speeds; and discontinuing calculating the first rotor speed when the limit value rotational speed is exceeded.

16. The method according to claim 15, further comprising resuming calculation of the first rotor speed when the second rotor speed is below the limit value rotational speed.

17. The method according to claim 15, further comprising determining the limit value rotational speed based on a difference between the first and the second calculated rotor speeds.

18. A method of detecting a rotor position of an electronically commuted motor, comprising the acts of:
providing a first method for determining the rotor position from electric parameters, without sensing the rotor position, by measuring an inductance;
providing a second method for determining the rotor position from electric parameters, without sensing the rotor position, by measuring an induced voltage;
determining a limit value rotational speed from a comparison of rotor position results of the first method and the second method;
below the limit value rotational speed selecting the rotor position derived by combining the first method and the second method for determining the rotor position, used contemporaneously in parallel; and
above the limit value rotational speed selecting the rotor position derived using exclusively the second method for determining the rotor position.

19. The method according to claim 18, further comprising controlling the electronically commuted motor using the selected rotor speed.

20. The method according to claim 18, further comprising discontinuing use of the second method below the limit value rotational speed after determination of the limit value rotational speed.

* * * * *